(12) United States Patent
Yerramalli et al.

(10) Patent No.: US 10,959,105 B2
(45) Date of Patent: Mar. 23, 2021

(54) METHODS, APPARATUSES AND SYSTEMS FOR CONFIGURING BANDWIDTH PARTS IN SHARED SPECTRUM

(71) Applicant: QUALCOMM Incorporated, San Diego, CA (US)

(72) Inventors: Srinivas Yerramalli, San Diego, CA (US); Rahul Malik, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 144 days.

(21) Appl. No.: 16/143,281

(22) Filed: Sep. 26, 2018

(65) Prior Publication Data
US 2019/0104416 A1    Apr. 4, 2019

Related U.S. Application Data

(60) Provisional application No. 62/565,634, filed on Sep. 29, 2017.

(51) Int. Cl.
*H04W 4/00* (2018.01)
*H04W 16/14* (2009.01)
(Continued)

(52) U.S. Cl.
CPC ......... *H04W 16/14* (2013.01); *H04W 72/042* (2013.01); *H04W 72/0406* (2013.01);
(Continued)

(58) Field of Classification Search
None
See application file for complete search history.

(56) References Cited

U.S. PATENT DOCUMENTS

| 2015/0327284 A1* | 11/2015 | Wakabayashi | ........ H04L 25/022 370/252 |
| 2016/0198471 A1* | 7/2016 | Young | ................... H04W 16/14 370/329 |

(Continued)

OTHER PUBLICATIONS

Huawei et al., "Channel and Interference Measurement Restriction", 3GPP Draft; R1-1714340 3rd Generation Partnership Project (3GPP), Mobiie Competence Centre, 650, Route Des Lucioles, F-06921 Sophia-Antipolis, Cedex, France, vol. RAN WG1, No. Prague, Czech Republic; Aug. 21, 2017-Aug. 25, 2017 Aug. 20, 2017, XP051317125, Retrieved from the Internet: URL: http://www.3gpp.org/ftp/Meetings_3GPP_SYNC/RAN1/Docs/ [retrieved on Aug. 23, 2017], 3 pages.

(Continued)

*Primary Examiner* — Phirin Sam
(74) *Attorney, Agent, or Firm* — Liem T. Do

(57) ABSTRACT

Methods, systems, and devices for wireless communication are described. A base station may configure a system bandwidth of shared spectrum partitioned into a plurality of bandwidth parts based on interference associated with each of the plurality of bandwidth parts. The base station may then transmit the configuration of the system bandwidth to a plurality of devices. A UE may receive, from a base station, a configuration of a system bandwidth of shared spectrum. The system bandwidth may be partitioned into a plurality of bandwidth parts based on interference associated with each of the plurality of bandwidth parts. The UE may then communicate with the base station on at least one of the bandwidth parts.

30 Claims, 14 Drawing Sheets

(51) Int. Cl.
H04W 74/08 (2009.01)
H04W 72/04 (2009.01)
H04W 72/08 (2009.01)

(52) U.S. Cl.
CPC ..... *H04W 72/048* (2013.01); *H04W 74/0808* (2013.01); *H04W 72/0453* (2013.01); *H04W 72/08* (2013.01)

(56) References Cited

U.S. PATENT DOCUMENTS

| | | | | |
|---|---|---|---|---|
| 2017/0019163 | A1* | 1/2017 | Yoshimoto | H04L 1/00 |
| 2018/0176937 | A1* | 6/2018 | Chen | H04W 74/085 |
| 2019/0053029 | A1* | 2/2019 | Agiwal | H04W 48/12 |
| 2019/0181922 | A1* | 6/2019 | Lee | H04L 5/0094 |

OTHER PUBLICATIONS

Huawei et al., "Coexistence and Channel Access for NR Unlicensed Band Operation", R1-1715581, 3rd Generation Partnership Project (3GPP), Mobile Competence Centre, 650, Route Des Lucioles, F-06921 Sophia-Antipolis Cedex, France, vol. RAN WG1, No. Nagoya, Japan; Sep. 18, 2017-Sep. 21, 2017 Sep. 17, 2017, XP051339648, Retrieved from the Internet: URL: http://www.3gpp.org/ftp/Meetings_3GPP_SYNC/RAN1/Docs/[retrieved on Sep. 17, 2017], 5 pages.

International Search Report and Written Opinion—PCT/US2018/053220—ISA/EPO—Dec. 3, 2018.

NTT Docomo et al., "Remaing Issues on Bandwidth Parts for NR", R1-1716109 Wider BW for NR, 3rd Generation Partnership Project (3GPP), Mobile Competence Centre, 650, Route Des Lucioles, F-06921 Sophia-Antipolis Cedex, France, vol. RAN WG1, No. Nagoya, Japan; Sep. 18, 2017-Sep. 21, 2017 Sep. 17, 2017, XP051339567, Retrieved from the Internet: URL: http://www.3gpp.org/ftp/Meetings_3GPP_SYNC/RAN1/Docs/ [retrieved on Sep. 17, 2017], 5 pages.

Samsung: "Wider Bandwidth Operations", 3GPP Draft; R1-1713654 Wider Bandwidth Operations, 3rd Generation Partnership Project (3GPP), Mobile Competence Centre, 650, Route Des Lucioies, F-06921 Sophia-Antipolis Cedex, France, vol. RAN WG1, No. Prague, Czech Republic; Aug. 21, 2017-Aug. 26, 2017 Aug. 20, 2017, XP051316454, Retrieved from the Internet: URL:http://www.3gpp.org/ftp/Meetings_3GPP_SYNC/RAN1/Docs/ [retrieved on Aug. 20, 2017], 9 pages.

* cited by examiner

```
┌─────────────────────────────────────────┐
│ Configure each bandwidth part to match  │
│ a system requirement of a radio access  │── 410
│ technology associated with the          │
│ interference                            │
└─────────────────────────────────────────┘
                    ↓
┌─────────────────────────────────────────┐
│ Configure a size of each bandwidth part │── 420
│ based on the interference               │
└─────────────────────────────────────────┘
                    ↓
┌─────────────────────────────────────────┐
│ Configure a first bandwidth part of the │
│ plurality of bandwidth parts for        │── 430
│ downlink transmission based on          │
│ interference measured at UE             │
└─────────────────────────────────────────┘
                    ↓
┌─────────────────────────────────────────┐
│ Configure a second bandwidth part of    │
│ the plurality of bandwidth parts for    │── 440
│ uplink transmission based on            │
│ interference measured at base station   │
└─────────────────────────────────────────┘
                    ↓
┌─────────────────────────────────────────┐
│ Configure multiple bandwidth parts for  │
│ downlink transmission including a       │── 450
│ priority for common search space among  │
│ the multiple bandwidth parts            │
└─────────────────────────────────────────┘
                    ↓
┌─────────────────────────────────────────┐
│ Configure a UE-specific control         │
│ resource set for receiving              │── 460
│ cross-bandwidth part scheduling for     │
│ uplink, downlink, or sidelink           │
└─────────────────────────────────────────┘
                    ↓
┌─────────────────────────────────────────┐
│ Configure a priority among multiple     │── 470
│ bandwidth parts configured for uplink   │
│ transmission                            │
└─────────────────────────────────────────┘
                    ↓
┌─────────────────────────────────────────┐
│ Configure UE to perform a first LBT     │
│ type when an uplink grant is associated │
│ with self-bandwidth part scheduling,    │── 480
│ and to perform a second LBT type when   │
│ an uplink grant is associated with      │
│ cross-bandwidth part scheduling         │
└─────────────────────────────────────────┘
```

METHODS, APPARATUSES AND SYSTEMS FOR CONFIGURING BANDWIDTH PARTS IN SHARED SPECTRUM

CROSS REFERENCE

The present Application for Patent claims priority to U.S. Provisional Application No. 62/565,634 by Srinivas Yerramalli et al., entitled "METHODS, APPARATUSES AND SYSTEMS FOR CONFIGURING BANDWIDTH PARTS IN SHARED SPECTRUM," filed Sep. 29, 2017, which is assigned to the assignee hereof.

BACKGROUND

The following relates generally to wireless communication, and more specifically to methods, apparatuses, and systems for configuring bandwidth parts in a shared radio frequency spectrum (or shared spectrum).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In NR, it has been contemplated that the system will support much larger bandwidths (400 MHz or more) as compared to previous generations of cellular systems. However, there may be UEs that are not capable of supporting these higher bandwidths during the initial deployment of the NR system or there may be UEs that do not need these higher bandwidths for their application. Furthermore, the NR system may also enable communication between base stations and UEs in a shared spectrum. Accordingly, the base stations and UEs may be required to implement good coexistence mechanisms to avoid interference to other users' who may have ongoing active transmissions and who may utilize other radio access technologies (RATs). These RATs may employ various bandwidth configurations which may make it challenging to efficiently share the medium across all users of the spectrum. Improved techniques for configuring bandwidth parts in shared spectrum may thus be desired.

SUMMARY

The described techniques relate to improved methods, systems, devices, and apparatuses that support long term channel sensing in shared spectrum. In an aspect, a method for wireless communication includes configuring a system bandwidth of shared spectrum partitioned into a plurality of bandwidth parts based on interference associated with each of the plurality of bandwidth parts and transmitting the configuration of the system bandwidth to a plurality of devices. In another aspect, a method for wireless communication includes receiving, from a base station, a configuration of a system bandwidth of shared spectrum, the system bandwidth being partitioned into a plurality of bandwidth parts based on interference associated with each of the plurality of bandwidth parts, and communicating, with the base station, on at least one of the bandwidth parts.

In some other aspects, an apparatus for wireless communication includes a processor, memory in electronic communication with the processor, and instructions stored in the memory. The instructions are executable by the processor to configure a system bandwidth of shared spectrum partitioned into a plurality of bandwidth parts based on interference associated with each of the plurality of bandwidth parts and to transmit the configuration of the system bandwidth to a plurality of devices. In still other aspects, an apparatus for wireless communication includes a processor, memory in electronic communication with the processor, and instructions stored in the memory. The instructions are executable by the processor to receive, from a base station, a configuration of a system bandwidth of shared spectrum, the system bandwidth being partitioned into a plurality of bandwidth parts based on interference associated with each of the plurality of bandwidth parts, and to communicate, with the base station, on at least one of the bandwidth parts.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims

BRIEF DESCRIPTION OF THE DRAWINGS

FIGS. 3-5 illustrate block flow diagrams of methods for supporting a configuration of bandwidth parts in a shared spectrum in accordance with aspects of the present disclosure.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Aspects of the disclosure are initially described in the context of a wireless communications system. Examples of techniques for long term channel sensing are described herein. Aspects of the disclosure are further illustrated by and described with reference to apparatus diagrams, system diagrams, flowcharts, and appendix that support various configurations of bandwidth parts in a shared spectrum.

Figure 1:
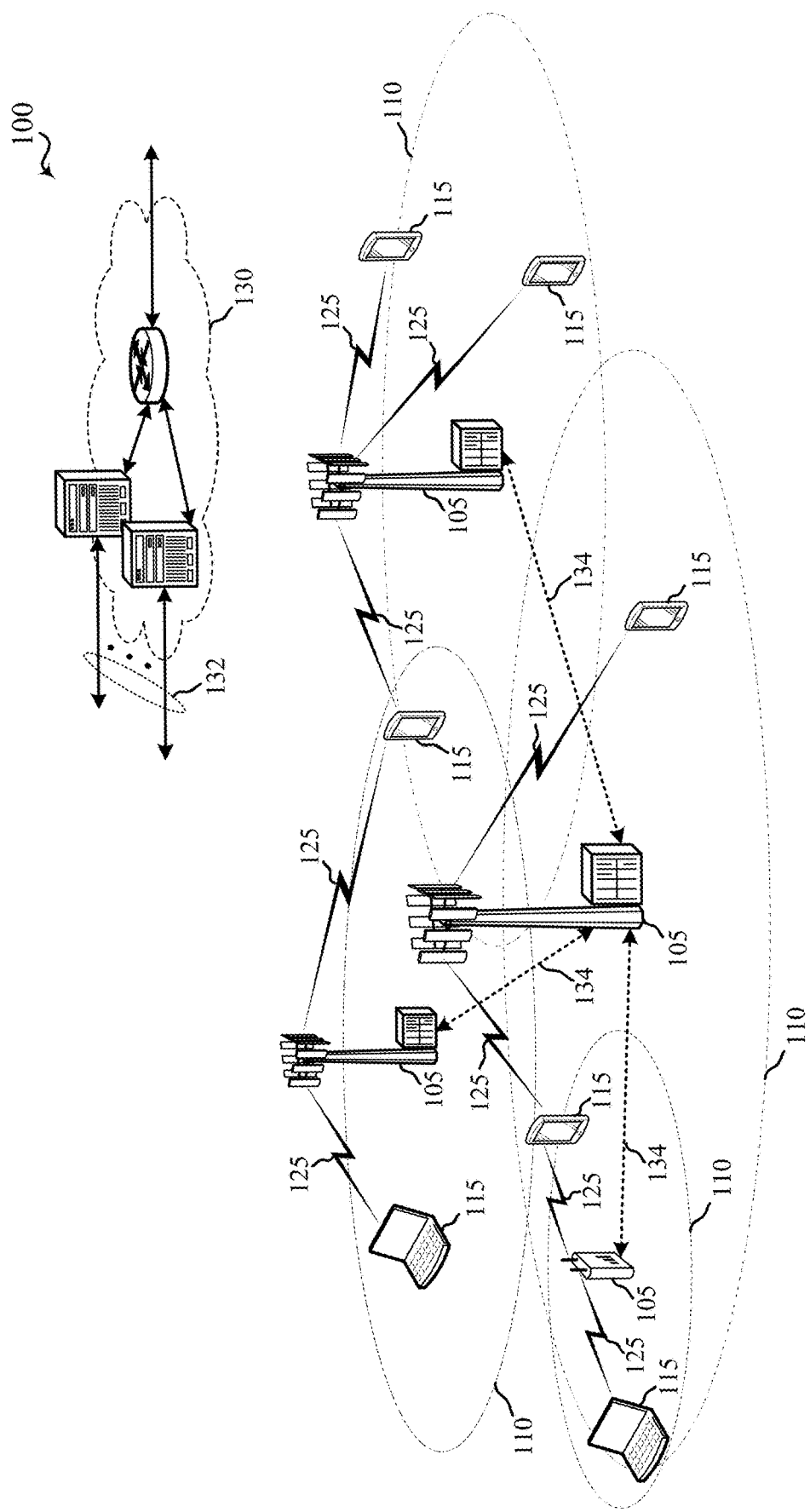
FIG. 1 illustrates an example of a system for wireless communication in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a New Radio (NR) network, a Long Term Evolution (LTE) network, or an LTE-Advanced (LTE-A) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., MTC, narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. eMTC devices may build on MTC protocols and support lower bandwidths in the uplink or downlink, lower data rates, and reduced transmit power, culminating in significantly longer battery life (e.g., extending batter life for several years). References to an MTC may also refer to an eMTC configured device.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation (CA) configuration in conjunction with component carriers (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Media Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as CA or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

According to techniques described herein, wireless communications system 100 may support a configuration of bandwidth parts in a shared spectrum. Base station 105 may utilize one or more component carriers (CCs) in the shared spectrum. For each CC, base station 105 may partition a carrier bandwidth (may also be referred to as a system bandwidth) into a plurality of bandwidth (BW) parts. Partitioning may be based on an interference profile associated with each of the BW parts or on some other desired metric.

Base stations may instruct UEs to communicate using BW parts in a variety of manners. For example, a base station may configure a UE 115 to communicate in one or more BW parts. Here the configuration may be done via sending instructions to the UE. In some scenarios, the UE 115 may be configured with the same or different BW parts for downlink and uplink transmission. In this regard, the UE 115 may monitor the configured BW part for downlink signals (primary and secondary synchronization signals (PSS/SSS), physical broadcast channel (PBCH), physical downlink control channel (PDCCH), etc.) that have cleared the medium, and may ignore the other BW parts which were not configured for the UE. In some examples, the base station 105 may detect a change in the interference profile, and may partition the carrier bandwidth into a new set of BW parts. The base station 105 may reconfigure the UE 115 to communicate in a different set of BW parts if needed. Techniques for supporting a configuration of BW parts in shared spectrum are described in more detail below.

Figure 2:
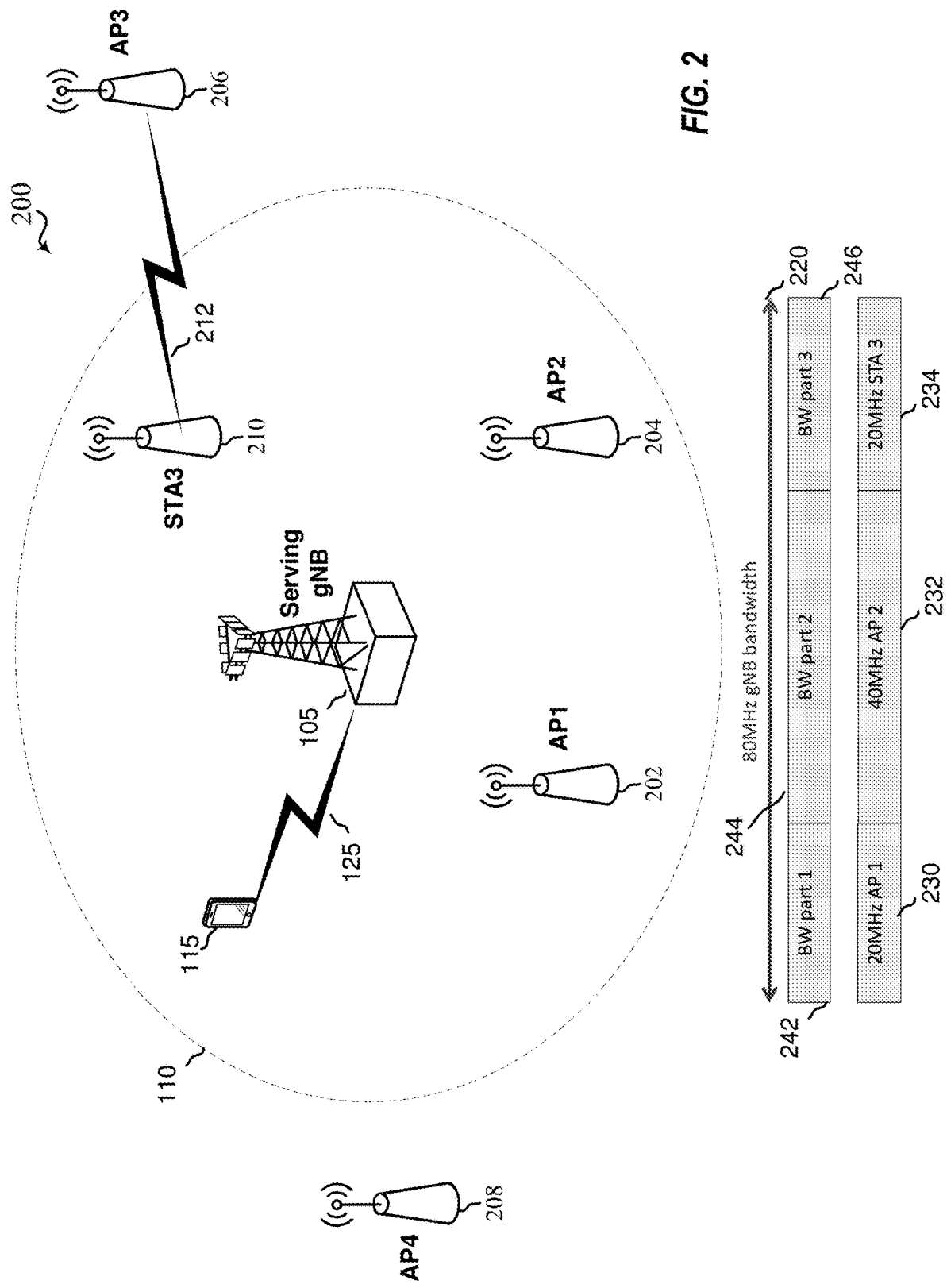
FIG. 2 illustrates an example of a system for wireless communication for supporting a configuration of bandwidth parts in a shared spectrum in accordance with aspects of the present disclosure.

FIG. 2 illustrates an example of a system 200 that may be support a configuration of bandwidth parts in a shared spectrum in accordance with various aspects of the present disclosure. In some examples, the system 200 may include a base station (or gNB) 105 which is associated with a geographic coverage area 110. The base station 105 may serve UE 115 via communication links 125, which may be examples of the corresponding devices as described with reference to FIG. 1. In some examples, the base station 105 and UE 115 may operate in a shared spectrum (shared medium or shared channel or shared band), which may be licensed or unlicensed. Accordingly, there may be coexistence mechanisms, such as listen before talk (LBT) or clear channel assessment (CCA) procedures, to ensure that the spectrum is fairly shared with other users of the medium. In one example, the spectrum may be shared with access points, such as AP1 202, AP2 204, AP3 206, AP4 208, and stations, such as STA3 210 in communication 212 with AP3 206. The APs 202, 204, 206, 208 may implement various radio access technologies (RATs) such as NR, LTE-U, LAA, MulteFire, WiFi, or the like.

The system 200 may implement a NR network in shared spectrum (NR-SS) which may support a carrier bandwidth of up to 400 MHz or more. Here, in this example, the base station 105 may utilize a CC having a carrier bandwidth 220 of 80 MHz. The base station 105 may detect devices, such as AP1 202, AP2 204 and STA3 210 that are operating within its coverage area 110. Additionally, the base station 105 may not be able to detect AP3 206 and AP4 208 since these devices may be outside the coverage area 110. The base station 105 may determine an interference profile associated with AP1 202, AP2 204 and STA3 210 that are currently communicating within the carrier bandwidth 220. For example, the base station 105 may detect that AP1 202 is utilizing a 20 MHz channel 230, AP2 204 is utilizing a 40 MHz channel 232, and STA3 is utilizing a 20 MHz channel 234. Each channel 230, 232, 234 may occupy a portion of the carrier bandwidth 220 as shown. It should be noted that only one CC is described herein for the sake of simplicity, and that the system 200 may deploy a plurality of CCs based on the available bandwidth in the shared spectrum.

In some examples, the base station 105 may configure the carrier bandwidth 220 based on the interference profile observed within the carrier bandwidth. The base station 105 may partition the carrier bandwidth 220 into a plurality of bandwidth (BW) parts to match a channelization of the RATs deployed in the shared spectrum. The carrier bandwidth 220 may be partitioned into BW part1 242, BW part2 244, and BW part3 246. BW part1 242 may be configured with a 20 MHz bandwidth to match the channelization of AP1 202, BW part2 244 may be configured with a 40 MHz bandwidth to match the channelization of AP2 204, and BW part3 246 may be configured with a 20 MHz bandwidth to match the channelization of STA3 210. Each BW part 242, 244, 246 may include a group of contiguous physical resource blocks (PRBs), and may be associated with a particular numerology (e.g., subcarrier spacing, cyclic prefix type, etc.), center frequency, and bandwidth. Accordingly, the base station 105 may send the BW part configuration to the UE 115, and may reserve resources within any of the BW parts for communication with the UE 115 and other UEs (not shown) within its coverage area 110. In some examples, there may be no gap (e.g., no guard band) between adjacent BW parts 242 and 244, and between adjacent BW parts 244 and 246. The base station 105 may transmit on multiple BW parts at the same time if it clears the medium in those BW parts together as will be described in detail later. This may appear as a continuous transmission for UEs configured to operate within those adjacent BW parts. In other examples, there may be a gap (e.g., guard band) between adjacent BW parts to match the channelization of the nodes in the area. The base station 105 may subsequently detect a change in the interference profile (e.g., new nodes entering coverage area or existing nodes leaving the coverage area) and may reconfigure the carrier bandwidth 220 accordingly.

In some examples, the base station 105 may have the flexibility to configure the UEs with one or more of the BW parts based on their capabilities. For example, some UEs may not have the capability of monitoring higher bandwidths such as 80 MHz, 100 MHz, 200 MHz, 400 MHz, etc. Thus, by partitioning the carrier bandwidth 220 into smaller BW parts, the base station 105 may semi-statically configure these UEs to operate in a single BW part (or single carrier operation). In that regard, these UEs may only be required to monitor a part of the carrier bandwidth 220 for discovery signals, control, data, signaling, and the like. Furthermore, although the UE may have the capability to operate on larger bandwidths, the base station 105 may have the flexibility to configure the UE with a smaller BW part in some applications that do not require a lot of bandwidth, and thus utilizing the carrier bandwidth 220 in an efficient manner.

It should be noted that the configuration of the BW parts may be dependent on the RAT that is deployed in the spectrum or regulatory requirements for operating in that spectrum band. For example, in the 3.5 GHz shared band, one may configure a BW part in 10 MHz to match an LTE based technology. In the 5 GHz shared band, one may configure a BW part in 20 MHz or multiples of 20 MHz (e.g., 40 MHz, 60 MHz, 80 MHz) to match WiFi, LAA, and MulteFire. In the 60 GHz shared band, one may configure a BW part in 500 MHz which would achieve full power at 13 dBm/MHz power spectral density and 40 dBm transmit power constraint. Further, a size of the BW parts may be configured based on the interference profile determined by base station. For example, the BW parts may be configured with 20 MHz parts, 40 MHz parts, and 80 MHz parts in the presence of devices/nodes (e.g., WiFi nodes, LAA nodes, MulteFire nodes) operating with 20 MHz, 40 MHz, and 80 MHz channels, respectively. In some examples, base station 105 may configure the BW parts by using the smallest size bandwidth (associated with one of the nodes) if multiple devices/nodes with non-overlapping bandwidth support are within the same coverage area. In some other examples, the smallest size bandwidth for a BW part may be equal to a bandwidth requirement for transmission of the SS block to facilitate cell acquisition.

The base station 105 and UE 115 may be required to implement coexistence mechanisms to ensure that the spectrum is fairly shared with other users of the medium (e.g., AP1 202, AP2 204, AP3 206, AP4 208, STA3 210). The coexistence mechanisms may include channel sensing procedures to contend for access to the shared spectrum. Base station 105 and UE 115 may perform a listen before talk (LBT) or clear channel assessment (CCA) procedure to determine whether the medium is available for transmission. In some examples, the base station 105 and UE 115 may perform energy detection in an omni directional manner to determine whether there are any other active transmissions going on. In other examples, the base station 105 and UE 115 may detect specific sequences (e.g., preamble, reservation signal, beacons, etc.) that indicate use of the medium. In that regard, base station 105 and UE 115 may perform channel sensing on a per BW part basis. That is, the channel sensing procedure may be performed independently per BW part. In some other examples, the channel sensing procedure may be performed independently per subset of each BW part.

In some scenarios, configuring a carrier bandwidth into BW parts and performing channel sensing on each BW part independent of the other BW parts can facilitate efficient TDM sharing. Such sharing may be among or between different base stations (e.g., gNBs) and other devices/nodes within the same coverage area. For example, base station 105 does not communicate in BW part2 244 as long as AP2 204 is transmitting in its 40 MHz carrier 232. However, base station 105 may transmit in BW part1 242 and BW part3 246 if it was determined that BW part1 242 and BW part3 246, respectively, were cleared for transmission. In this scenario, the base station 105 would refrain from transmitting on carrier bandwidth 220 if it was not configured with BW parts 242, 244, 246 since the channel sensing procedure would have detected active transmissions from AP2 204 in the middle portion of the carrier bandwidth 220. Therefore, by configuring the BW parts 242, 244, 246 to match the transmission bandwidth of the other nodes (interferers in the area) and performing channel sensing independently on each BW part, the base station 105 and/or the other nodes (AP1 202, AP2 204, AP3 206, AP4 208, and STA3 210) may efficiently share the entire carrier bandwidth 220 at any point in time.

In some examples, channel sensing may include a spatial LBT procedure. Instead of performing channel sensing in an omni directional manner, a node performs directional channel sensing and directional transmission using multiple antennas to reduce interference to receivers of other ongoing transmissions. That is, spatial LBT may allow a node to transmit on top of an existing transmission on the medium by utilizing the multiple spatial dimensions associated with multiple antennas. For example, the base station 105 may perform spatial LBT in BW part3 246 and directional transmission 125 (e.g., precoding) to the UE 115 to avoid interfering with or minimize interference to the existing transmission 212 of STA3 210. Therefore, performing spatial LBT in BW part3 246 may increase utilization of the medium by exploiting the spatial dimension. In some examples, spatial LBT may be performed independently per BW part. That is, the base station 105 may perform independent spatial LBT and directional sensing for each BW part. This can reduce interference to and from different nodes operating in different parts of the shared spectrum.

In some examples, the base station 105 may support millimeter wave (mmW) communications with the UE 115 in mmW or EHF bands. The base station 105 may use multiple antennas or antenna arrays to perform beamforming operations (e.g., base stations with hybrid analog-digital precoding). Beamforming (which may also be referred to as spatial filtering or directional transmission) is a signal processing technique that may be used at a transmitter (e.g., base station 105) to shape and/or steer an overall antenna beam in the direction of a target receiver (e.g., UE 115). The base station 105 may implement multiple digital antenna ports in mmW which enables it to perform tone beamforming and spatial LBT in different directions. For example, the base station 105 may use different tones within a BW part or across BW parts to sense the channel in different directions. That is, the base station 105 may perform channel sensing in two different directions at the same time from different BW parts.

In some examples, the base station 105 may adjust a transmission power level independently per BW part to reduce interference to other nodes within the coverage area 110. Additionally, the base station 105 may reduce a transmission power level to increase the probability of LBT clearance. In some scenarios, the base station 105 may be allowed to transmit at a lower power level even if it has detected another transmission. In this regard, the base station 105 may change the transmit power in one BW part relative to the other BW parts and not adversely affect the UE 115 since multiple BW parts are configured in this example. Furthermore, the base station 105 may adjust a transmit power in each transmission opportunity (e.g., successful LBT or CCA) independently per BW part.

In shared spectrum, it is important to implement coexistence algorithms to avoid interference to nearby receivers having an active transmission. As described above, various channel sensing techniques may be implemented to achieve such good coexistence with other users sharing the spectrum. Additionally, the base station 105 may configure the UE 115 with BW parts for downlink transmission (referred to as downlink BW parts) and some BW parts for uplink transmission (referred to as uplink BW parts). In some examples, the downlink BW parts may be different from the uplink BW parts. In some other examples, the downlink BW parts may be the same as the uplink BW parts. Accordingly, the flexibility in configuring the downlink and uplink BW parts may help minimize interference to receivers near the UE 115 and/or base station 105. In that regard, the downlink BW parts for the UE 115 (or other UEs being scheduled) may be determined based on measurement reporting of the UE's interferers (e.g., interference measured or obtained at the UE 115). The uplink BW parts for the UE 115 (or other UEs being scheduled) may be determined based on measurement of the base station's interferers (e.g., interference measured or obtained at the base station 105).

In some examples, the base station 105 may configure the UE 115 with one or more control resource sets (coreset) to monitor for control information on the downlink. The coreset may have one or more common search spaces (common coreset) and UE-specific search spaces (UE-specific coreset). The base station 105 may configure multiple common search spaces (one for each BW part), and may define a priority for the common search space among the BW parts configured for downlink. The base station 105 may use the common search space to transmit system information broadcast, paging, beam management related signaling, transmit power control, PDCCH order grants, and the like. In other words, the base station 105 may transmit such information in any one of the BW parts and not be restricted to transmit the information on a particular BW part. It may be beneficial in shared spectrum since it provides diversity. The UE 115 may monitor the common search space in the BW parts as defined by the priority depending on which BW parts clear the medium in a given transmission opportunity. For example, the base station 105 may define a priority with respect to BW part1 242 (highest priority), BW part2 244 (middle priority), and BW part3 246 (lowest priority). Accordingly, the UE 115 may first monitor the common search space of BW part1 242, and if transmission did not clear in BW part1, may then go to BW part2 244 and monitor the common search space of BW part2, and so forth.

The base station 105 may use the UE-specific search space to transmit control information for a specific UE. In some examples, the base station 105 may configure a UE-specific coreset for cross-BW part scheduling. Accordingly, the UE 115 may only monitor this UE-specific coreset when there is no downlink transmission in a corresponding BW part. For example, the base station 105 may configure the UE 115 with BW part1 242 and BW part3 246, and may configure a UE-specific coreset for UE to receive cross-BW part scheduling. The base station 105 may transmit an uplink grant in the configured UE-specific coreset (e.g., PDCCH) on BW part1 242. The uplink grant is for a scheduled uplink transmission on BW part3 246. The base station 105 does not transmit a downlink channel (e.g., PDCCH) on BW part3 246. Thus, since the UE 115 detects that there is no downlink transmission on BW part3 246 (corresponding BW part), it monitors the UE-specific coreset on BW part1 242 for an uplink grant (if any) associated with BW part3 246. This type of scheduling may be dynamic in that if a BW part clears the medium then the UE 115 monitors for uplink grants in that BW part, an if it does not clear the medium then the UE monitors for uplink grants in a different BW part. It should be noted that the UE-specific coreset may also be used for cross-BW part scheduling for downlink and sidelink grants.

In some examples, the UE 115 may monitor for downlink control information (DCI) of a particular size or payload depending on which set of BW parts have cleared the medium. In some other examples, the UE 115 may monitor for DCI of a particular type or format depending on which set of BW parts have cleared the medium. For example, the base station 105 may configure the UE 115 with BW part1 242 and BW part 244 for downlink. If only BW part1 242 clears the medium, the UE 115 may monitor a first DCI size or format for control information. If only BW part2 244 clears the medium, the UE 115 may monitor a second DCI size or format (which could be the same or different from the first DCI size or format). If both BW parts 242 and 244 clear the medium together, the UE 115 may monitor a third DCI size or format on BW part1 (different from first DCI size or format) which may be used to schedule both BW parts jointly.

In some examples, the base station 105 may configure the UE 115 to perform a LBT procedure based on the type of scheduling that is used. For example, the base station 105 may configure the UE 115 to perform a short or one-shot LBT procedure (e.g., 25 microseconds) when the uplink grant is received in the same BW part as the scheduled uplink transmission. In this scenario, if the uplink grant and uplink transmission are in the same BW part, the UE 115 may perform a short LBT prior to transmitting on the uplink. Alternatively, the base station 105 may configure the UE 115 to perform a long LBT procedure (e.g., Category 4 LBT) when the uplink grant is received in a different bandwidth part than the scheduled uplink transmission (cross-BW part scheduling). In this scenario, if the uplink grant and uplink transmission are in different BW parts, the UE may perform a long LBT prior to transmitting on the uplink.

Figure 3:
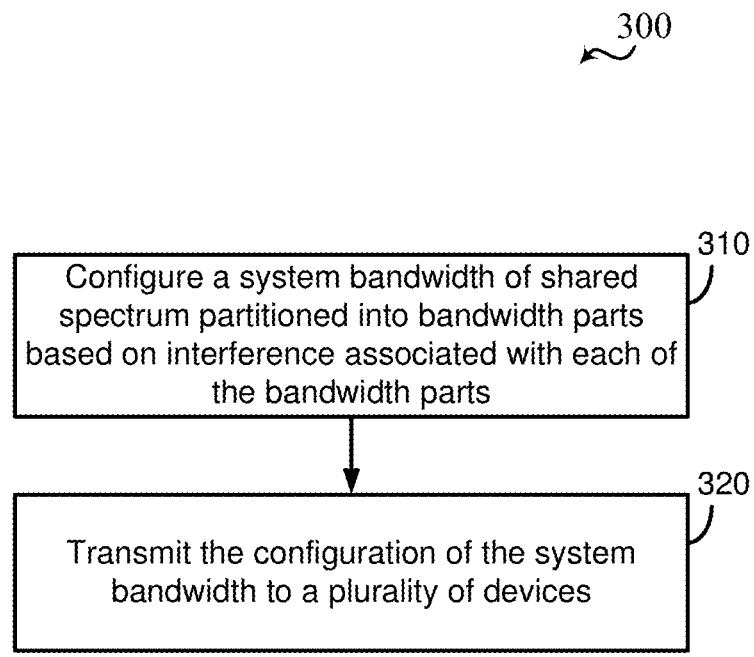
Figure 5:
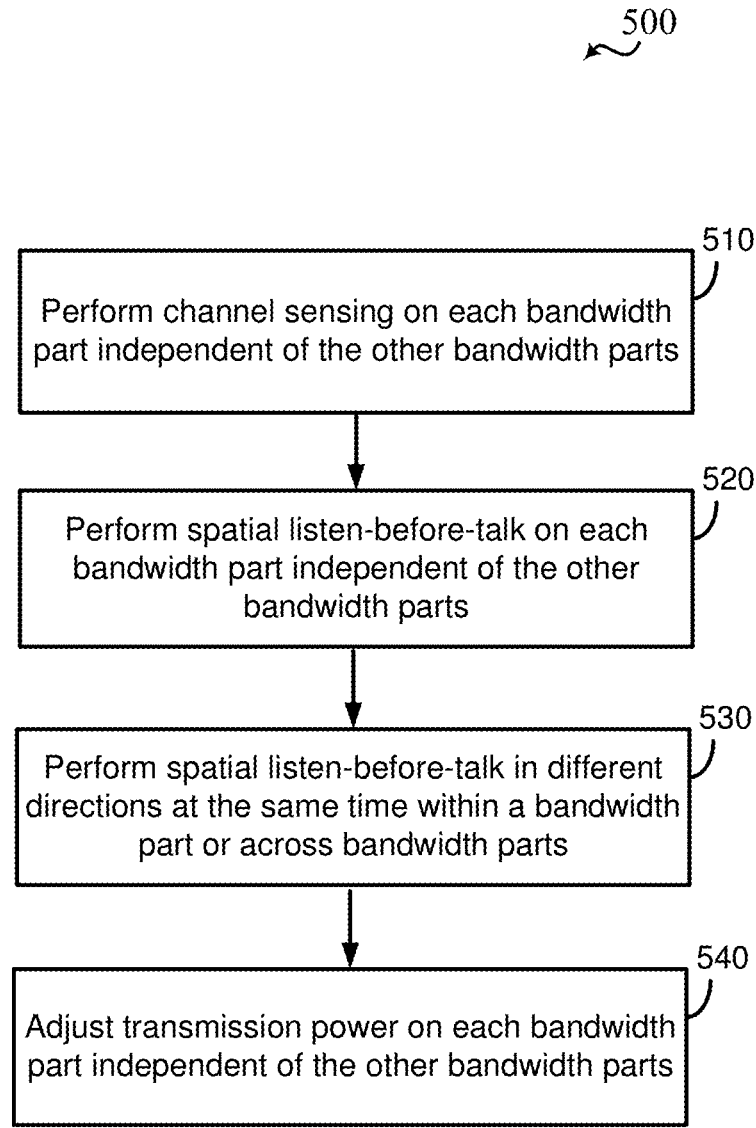

FIGS. 3-5 illustrate block flow diagrams of methods for supporting a configuration of bandwidth parts in a shared spectrum in accordance with various aspects of the present disclosure. The operations of these methods may be implemented by a base station 105 or its components as described herein with reference to FIGS. 6-8. In some examples, a base station 105 may execute a set of codes to control the functional elements of the device to perform the functions described below. Additionally or alternatively, the base station 105 may perform aspects of the functions described below using special-purpose hardware.

In FIG. 3, a method 300 for supporting a configuration of bandwidth parts in a shared spectrum is provided. At block 310, a base station 105 may configure a system bandwidth of shared spectrum partitioned into a plurality of BW parts based on interference associated with each of the BW parts. The operations of block 310 may be performed according to the methods described herein. In some examples, the base station 105 may configure a carrier bandwidth into a plurality of BW parts based on an interference profile as described with reference to FIG. 2.

At block 320, the base station 105 may transmit the configuration of the system bandwidth to a plurality of devices. The operations of block 320 may be performed according to the methods described herein. In some examples, the base station 105 may send the configuration of BW parts to the UEs within its coverage area. In some other examples, the configuration of BW parts may be sent to a specific UE or group of UEs. The BW parts may be semi-statically configured for the specific UE or group of UEs. In still other examples, the configuration of BW parts may be sent to other base stations.

In FIG. 4, a method 400 for supporting a configuration of bandwidth parts in a shared spectrum is provided. In some examples, a base station 105 may configure one or more parameters related to bandwidth parts for the UE 115. The base station 105 may perform any combination of the blocks of method 400 as described below and with reference to FIG. 2.

At block 410, the base station 105 may configure each bandwidth part to match a system requirement of a radio access technology associated with the interference. The operations of block 410 may be performed according to the methods described herein. In some examples, the base station 105 may configure the BW parts to match the local regulations and channelization of other technologies in the shared spectrum. For example, in the 3.5 GHz shared band, base station may configure a BW part in 10 MHz to match an LTE based technology. In the 5 GHz shared band, base station may configure a BW part in 20 MHz or multiples of 20 MHz (e.g., 40 MHz, 60 MHz, 80 MHz) to match WiFi, LAA, and MulteFire. In the 60 GHz shared band, base station may configure a BW part in 500 MHz which would achieve full power at 13 dBm/MHz power spectral density and 40 dBm transmit power constraint.

At block 420, the base station 105 may configure a size of each bandwidth part based on the interference. The operations of block 420 may be performed according to the methods described herein. In some examples, the base station 105 may configure the BW parts with 20 MHz parts, 40 MHz parts, and 80 MHz parts in the presence of devices/nodes (e.g., WiFi nodes, LAA nodes, MulteFire nodes) operating with 20 MHz, 40 MHz, and 80 MHz channels, respectively.

At block 430, the base station 105 may configure a first bandwidth part of the plurality of bandwidth parts for downlink transmission based on interference measured or obtained at UE. The operations of block 430 may be performed according to the methods described herein. In some examples, the base station 105 may configure downlink BW parts for a UE 115 to help minimize interference to receivers near the UE. In that regard, the downlink BW parts for the UE 115 (or other UEs being scheduled) may be determined based on measurement reporting of the UE's interferers (or other UEs' interferers).

At block 440, the base station 105 may configure a second bandwidth part of the plurality of bandwidth parts for uplink transmission based on interference measured at the base station. The operations of block 440 may be performed according to the methods described herein. In some examples, the base station 105 may configure uplink BW parts to help minimize interference to receivers near itself. In that regard, the uplink BW parts may be determined based on measurement of the base station's interferers.

At block 450, the base station 105 may configure multiple bandwidth parts for downlink transmission including a priority for common search space among the multiple bandwidth parts. The operations of block 450 may be performed according to the methods described herein.

In some examples, the base station 105 may configure the UE 115 with one or more control resource sets (coreset) to monitor for control information on the downlink. The coreset may have one or more common search spaces (common coreset) and UE-specific search spaces (UE-specific coreset). The base station 105 may configure multiple common search spaces (one for each BW part), and may define a priority for the common search space among the BW parts configured for downlink. The base station 105 may use the common search space to transmit system information broadcast, paging, beam management related signaling, transmit power control, PDCCH order grants, and the like. That is, the base station 105 may transmit such information in any one of the BW parts and not be restricted to transmit the information on a particular BW part. It may be beneficial in shared spectrum since it provides diversity. The UE 115 may monitor the common search space in the BW parts as defined by the priority depending on which BW parts clear the medium in a given transmission opportunity.

At block 460, the base station 105 may configure a UE-specific control resource set for receiving cross-bandwidth part scheduling for uplink, downlink, or sidelink. The operations of block 460 may be performed according to the methods described herein.

In some examples, the base station 105 may use the UE-specific search space to transmit control information for a particular UE. For example, the base station 105 may configure a UE-specific coreset for cross-BW part scheduling for uplink, downlink, or sidelink (e.g., for peer-to-peer communication) grants. Accordingly, the UE 115 may only monitor this UE-specific coreset when there is no downlink transmission in a corresponding BW part. In one example with reference to FIG. 2, the base station 105 may configure UE 115 with BW part1 242 and BW part3 246, and may configure a UE-specific coreset for UE to receive cross-BW part scheduling. The base station 105 may transmit an uplink grant in the configured UE-specific coreset (e.g., PDCCH) on BW part1 242. The uplink grant is for a scheduled uplink transmission on BW part3 246. The base station 105 does not transmit a downlink channel (e.g., PDCCH) on BW part3 246. Thus, since the UE 115 detects that there is no downlink transmission on BW part3 246 (corresponding BW part), the UE monitors the UE-specific coreset on BW part1 242 for an uplink grant (if any) associated with BW part3 246. This type of scheduling is dynamic in that if a BW part clears the medium then the UE monitors for uplink grants in that BW part, and if it does not clear the medium then the UE monitors for uplink grants in a different BW part.

At block 470, the base station 105 may configure a priority among multiple bandwidth parts configured for uplink transmission. The operations of block 470 may be performed according to the methods described herein. In some examples, base station may configure a UE with multiple uplink BW parts for transmitting information such as channel quality information (CQI) reports, ACK/NACK feedback, beam management reports (e.g., mmW operation), and the like. It should be noted that the configured uplink BW parts may be the same or different from the configured downlink BW parts. Furthermore, the priority associated with the uplink BW parts may be the same or different from the priority associated with the downlink BW parts.

At block 480, the base station 105 may configure the UE to perform a first LBT type when an uplink grant is associated with self-bandwidth part scheduling, and to perform a second LBT type when an uplink grant is associated with the cross-bandwidth part scheduling. In some examples, the first LBT type has a shorter duration than the second LBT type. The operations of block 470 may be performed according to the methods described herein. In some examples, the base station 105 may configure the UE 115 to perform a short or one-shot LBT procedure (e.g., 25 microseconds) when the uplink grant is received in the same BW part as the scheduled uplink transmission (self-BW part scheduling). Alternatively, the base station 105 may configure the UE 115 to perform a long or extended LBT procedure (e.g., Category 4 LBT) when the uplink grant is received in a different bandwidth part than the scheduled uplink transmission (cross-BW part scheduling).

In FIG. 5, a method 500 for supporting a configuration of bandwidth parts in a shared spectrum is provided. The base station 105 may be required to implement coexistence mechanisms to ensure that the spectrum is fairly shared with other users of the medium. The coexistence mechanisms may include channel sensing procedures to contend for access to the shared spectrum. The base station 105 may perform any combination of the blocks of method 400 as described below and with reference to FIG. 2.

At block 510, the base station 105 may perform channel sensing on each bandwidth part independent of the other bandwidth parts. The operations of block 510 may be performed according to the methods described herein. In some examples, the base station 105 may perform a listen before talk (LBT) or clear channel assessment (CCA) procedure to determine whether the medium is available for transmission. In that regard, base station 105 may perform channel sensing on a per BW part basis. That is, the channel sensing procedure may be performed independently per BW part.

At block 520, the base station 105 may perform spatial listen before talk (LBT) on each bandwidth part independent of the other bandwidth parts. The operations of block 520 may be performed according to the methods described herein. In some examples, the base station 105 may perform a spatial LBT procedure which may include directional channel sensing and directional transmission using multiple antennas to reduce interference to other receiving devices' ongoing transmissions. Accordingly, the base station 105 may perform independent spatial LBT and directional sensing for each BW part.

At block 530, the base station 105 may perform spatial listen before talk (LBT) in different directions at the same time within a bandwidth part or across bandwidth parts. The operations of block 530 may be performed according to the methods described herein. In some examples, the base station 105 may support millimeter wave (mmW) communications, and may implement multiple digital antenna ports which enables it to perform tone beamforming and spatial LBT in different directions. For example, the base station 105 may use different tones within a BW part or across BW parts to perform channel sensing in different directions at the same time.

At block 540, the base station 105 may adjust a transmission power on each bandwidth part independent of the other bandwidth parts. The operations of block 540 may be performed according to the methods described herein. In some examples, the base station 105 may adjust a transmission power level independently per BW part to reduce interference to other nodes in the same area. Additionally, the base station 105 may reduce a transmission power level to increase the probability of LBT clearance. In some examples, the base station 105 may detect some energy in a particular BW part but not enough to preclude all transmissions. For example, the base station may have detected an active transmission that may be far away. In that regard, the base station may operate at a lower transmit power level on that particular BW part. Thus, the base station 105 may adjust the transmit power independently per BW part.

Figure 6:
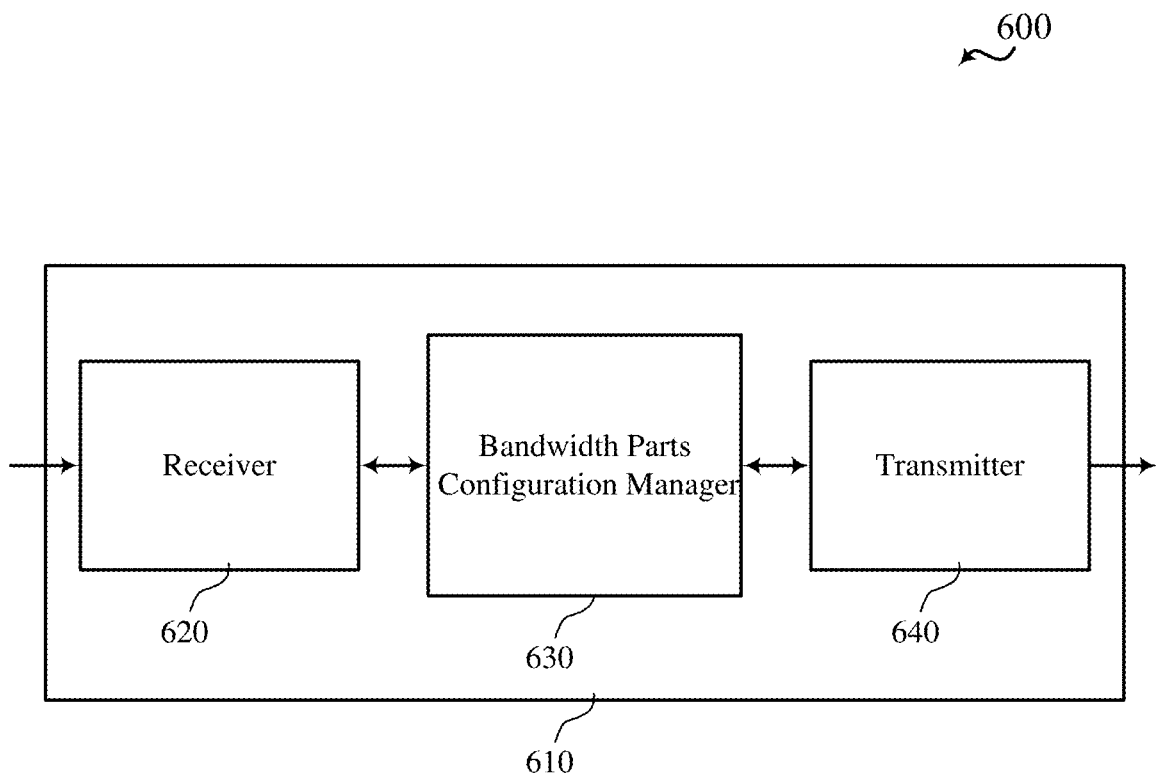
FIG. 6 illustrates a block diagram of a device that supports a configuration of bandwidth parts in a shared spectrum in accordance with aspects of the present disclosure.

FIG. 6 shows a block diagram 600 of a wireless device 610 that supports a configuration of bandwidth parts in a shared spectrum in accordance with aspects of the present disclosure. Wireless device 610 may be an example of aspects of a base station 105 as described herein. Wireless device 610 may include a receiver 620, bandwidth parts configuration manager 630, and transmitter 640. Wireless device 610 may also include a processor. Each of these components may be in communication with one another (e.g., via one or more buses).

Receiver 620 may receive information such as packets, user data, or control information associated with various uplink channels such as PUCCH, PUSCH, PRACH, sounding reference signal (SRS), scheduling request (SR). Information may be passed on to other components of the device. The receiver 620 may be an example of aspects of the transceiver 835 described with reference to FIG. 8. The receiver 620 may utilize a single antenna or a set of antennas.

Bandwidth parts configuration manager 630 may be an example of aspects of bandwidth parts configuration manager 815 described with reference to FIG. 8.

Bandwidth parts configuration manager 630 and/or at least some of its various sub-components may be implemented in hardware, software executed by a processor, firmware, or any combination thereof. If implemented in software executed by a processor, the functions of the bandwidth parts configuration manager 630 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The bandwidth parts configuration manager 630 and/or at least some of its various sub-components may be physically located at various positions, including being distributed such that portions of functions are implemented at different physical locations by one or more physical devices. In some examples, bandwidth parts configuration manager 630 and/or at least some of its various sub-components may be a separate and distinct component in accordance with various aspects of the present disclosure. In other examples, bandwidth parts configuration manager 630 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Bandwidth parts configuration manager 630 may configure one or more parameters associated BW parts in shared spectrum. In some examples, the bandwidth parts configuration manager 630 may configure each BW part to match a system requirement of the interferers in the coverage area. In other examples, the bandwidth parts configuration manager 630 may configure multiple downlink BW parts and uplink BW based on measurements at the UE and at the base station, respectively. The downlink BW parts may be the same or different from the uplink BW parts. In still other examples, the bandwidth parts configuration manager 630 may configure multiple BW parts with one or more coresets including common search space and UE-specific search space. In some other examples, bandwidth parts configuration manager 630 may configure an LBT procedure based on the type of scheduling that is used to schedule UE.

Transmitter 640 may transmit signals generated by other components of the device. In some examples, the transmitter 640 may be collocated with a receiver 620 in a transceiver module. For example, the transmitter 640 may be an example of aspects of the transceiver 835 described with reference to FIG. 8. The transmitter 640 may utilize a single antenna or a set of antennas.

Transmitter 640 may transmit the configuration of bandwidth parts to UEs or other base stations in the coverage area. In some examples, the transmitter 640 may transmit at a reduced power level for a BW part independent of the other BW parts.

Figure 7:
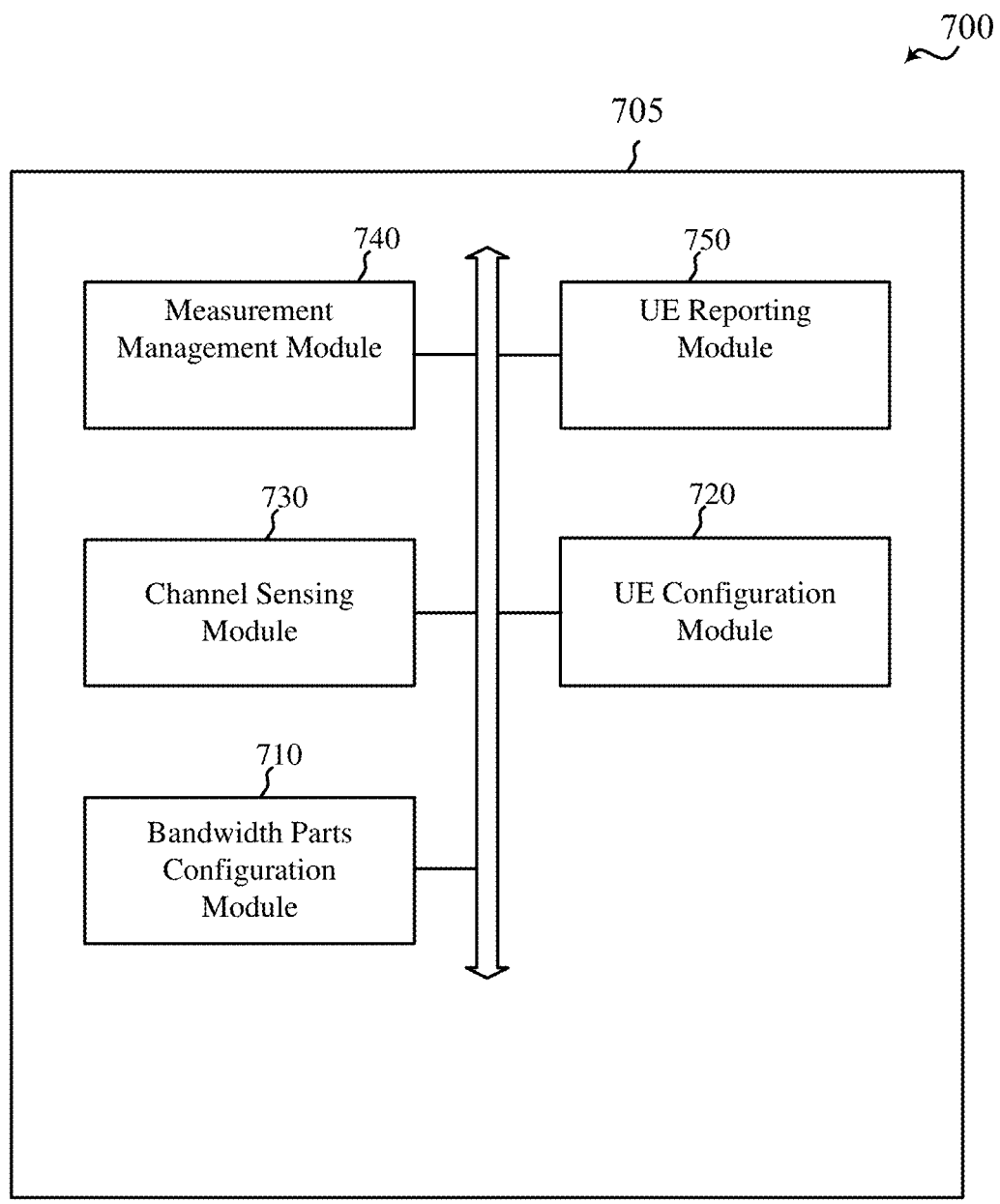
FIG. 7 illustrates a block diagram of a device that supports a configuration of bandwidth parts in a shared spectrum in accordance with aspects of the present disclosure.

FIG. 7 shows a block diagram 700 of a wireless device 705 that supports a configuration of bandwidth parts in a shared spectrum in accordance with aspects of the present disclosure. Wireless device 705 may be an example of aspects of a wireless device 805 or a base station 105 as described herein. Wireless device 705 may include bandwidth parts configuration module 710, UE configuration module 720, channel sensing module 730, measurement management module 740, and UE reporting module 750. Wireless device 705 may also include a processor. Each of these components may be in communication with one another (e.g., via one or more buses).

Bandwidth parts configuration module 710 may maintain a configuration of bandwidth parts in a shared spectrum. Each BW part may include a group of contiguous PRBs, and may be associated with a particular numerology (e.g., sub-carrier spacing, cyclic prefix type, etc.), center frequency, and bandwidth as described herein.

UE configuration module 720 may maintain a configuration for UE to operate in BW parts in a shared spectrum. The configuration may include downlink and uplink BW parts, priority related to the downlink and uplink BW parts, LBT procedures, common and UE-specific search spaces associated with coresets, etc. as described herein.

Channel sensing module 730 may control various channel sensing procedures on a per BW part basis. The channel sensing procedures may include omni directional LBT, spatial LBT, short LBT, long LBT, etc. as described herein.

Measurement management module 740 may maintain measurements related to the interference profile in the coverage area as described herein.

UE reporting module 750 may maintain measurement and feedback reports from UE, such as CQI reports, radio resource management reports, ACK/NACK feedback, beam management reports, etc. as described herein.

Figure 8:
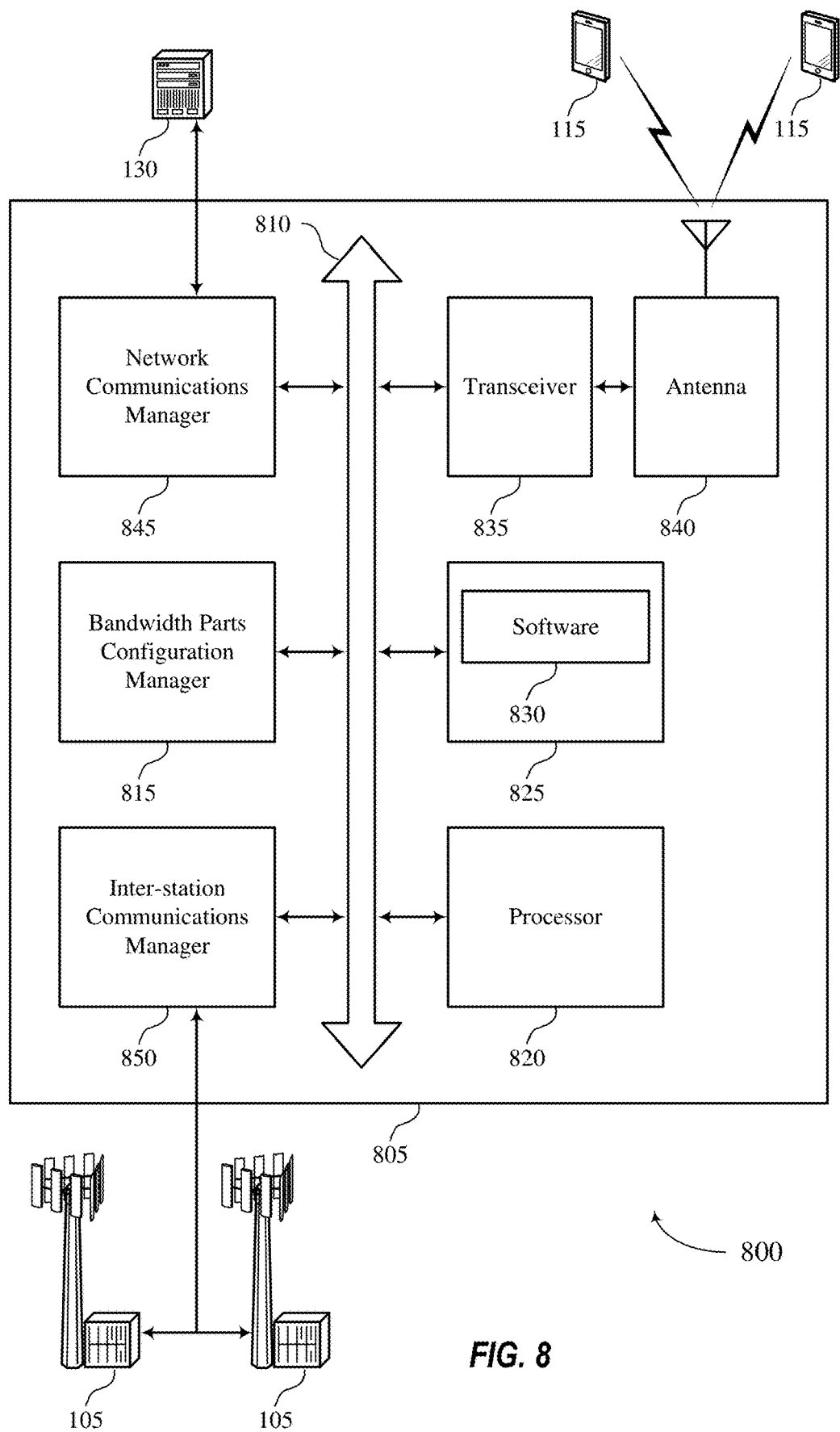
FIG. 8 illustrates a block diagram a system including a base station that supports a configuration of bandwidth parts in a shared spectrum in accordance with aspects of the present disclosure.

FIG. 8 shows a diagram of a system 800 including a device 805 that supports long term sensing in a shared spectrum in accordance with aspects of the present disclosure. Device 805 may be an example of or include the components of wireless device 610, or a base station 105 as described herein. Device 805 may include components for bi-directional voice and data communications including components for transmitting and receiving communications, including bandwidth parts configuration manager 815, processor 820, memory 825, software 830, transceiver 835, antenna 840, network communications manager 845, and inter-station communications manager 850. These components may be in electronic communication via one or more buses (e.g., bus 810). Device 805 may communicate wirelessly with one or more user equipment (UE)s 115.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting long term channel sensing in a shared spectrum).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support long term channel sensing in a shared spectrum. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

Network communications manager 845 may manage communications with the core network (e.g., via one or more wired backhaul links). For example, the network communications manager 845 may manage the transfer of data communications for client devices, such as one or more UEs 115.

Inter-station communications manager 850 may manage communications with other base station 105, and may include a controller or scheduler for controlling communications with UEs 115 in cooperation with other base stations 105. For example, the inter-station communications manager 850 may coordinate scheduling for transmissions to UEs 115 for various interference mitigation techniques such as beamforming or joint transmission. In some examples, inter-station communications manager 850 may provide an X2 interface within an Long Term Evolution (LTE)/LTE-A wireless communication network technology to provide communication between base stations 105.

FIGS. 9-12 illustrate block flow diagrams of various methods for supporting a configuration of bandwidth parts in a shared spectrum in accordance with aspects of the present disclosure. The operations of these methods may be implemented by a UE 115 or its components as described herein with reference to FIGS. 13-14. In some examples, a UE 115 may execute a set of codes to control the functional elements of the device to perform the functions described below. Additionally or alternatively, the UE 115 may perform aspects of the functions described below using special-purpose hardware.

Figure 9:
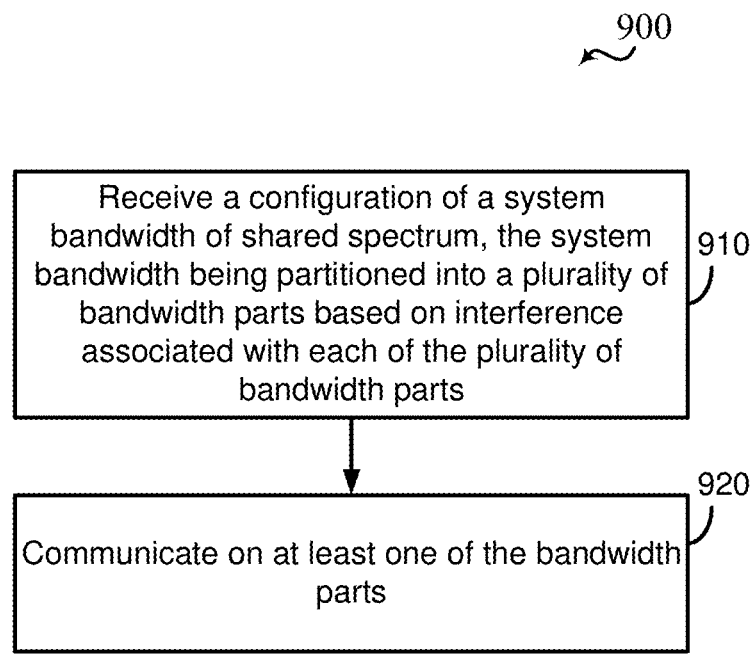
FIGS. 9-12 illustrate block flow diagrams of methods for supporting a configuration of bandwidth parts in a shared spectrum in accordance with aspects of the present disclosure.

In FIG. 9, a method 900 for supporting a configuration of bandwidth parts in a shared spectrum is provided. At block 910, the UE 115 may receive a configuration of a system bandwidth of shared spectrum. The system bandwidth may be partitioned into a plurality of bandwidth parts based on interference associated with each bandwidth part. The operations of block 910 may be performed according to the methods described herein.

At block 920, the UE 115 may communicate on at least one of the bandwidth parts. The operations of block 920 may be performed according to the methods described herein. In some examples, the UE 115 may be configured with one or more BW parts for downlink transmission and one or more BW parts for uplink transmission.

Figure 10:
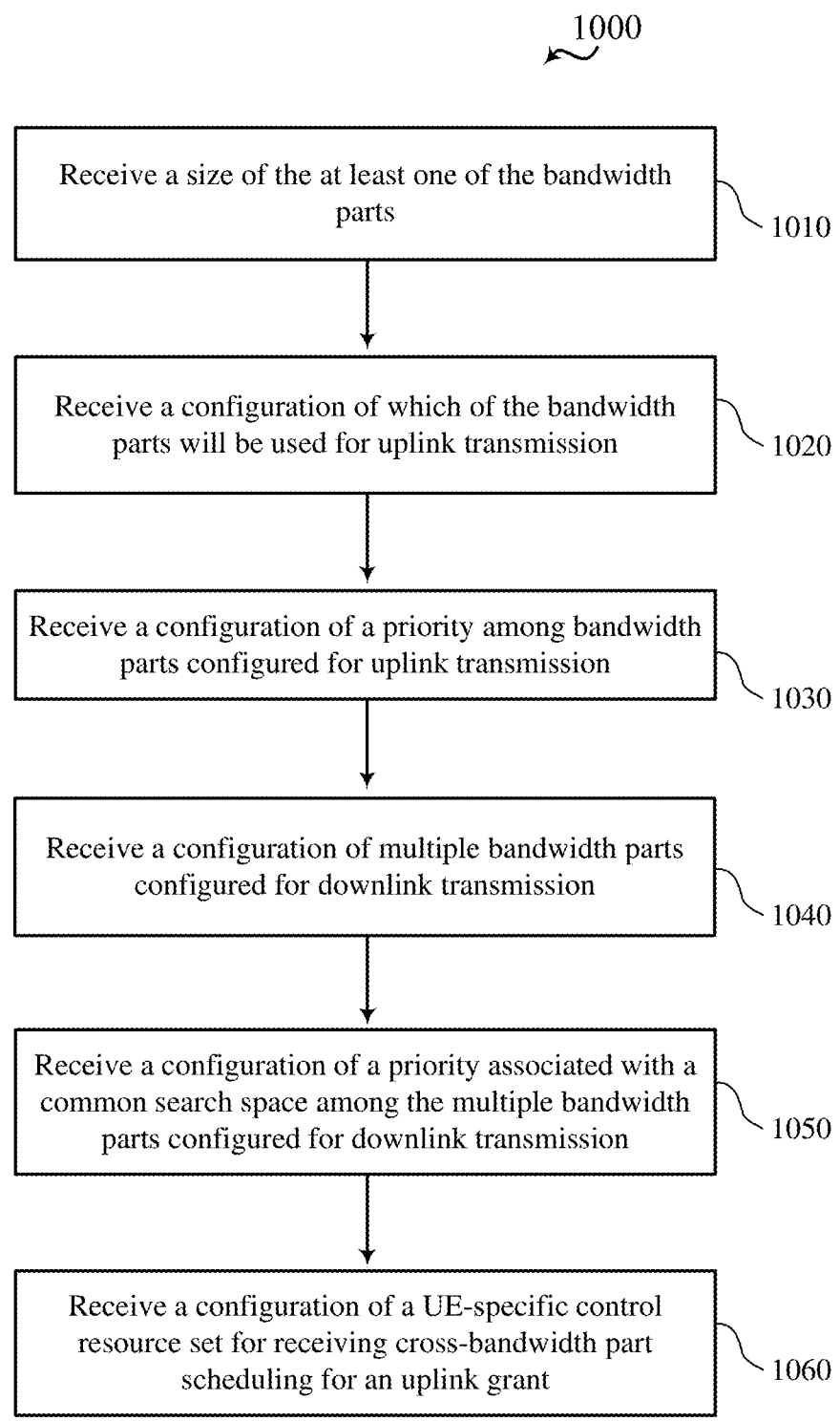

In FIG. 10, a method 1000 for supporting a configuration of bandwidth parts in a shared spectrum is provided. In some examples, the UE 115 may receive one or more parameters related to a configuration of bandwidth parts from base station 105. The UE 115 may perform any combination of the blocks of method 1000 as described below and with reference to FIG. 2.

At block 1010, the UE 115 may receive a size of the at least one of the bandwidth parts. The operations of block 1010 may be performed according to the methods described herein. In some examples, the UE 115 may receive information related to a size of the BW part which may be configured based on the interference profile determined by base station. For example, the UE 115 may be configured with 20 MHz parts, 40 MHz parts, and 80 MHz parts in the presence of devices/nodes (e.g., WiFi nodes, LAA nodes, MulteFire nodes) operating with 20 MHz, 40 MHz, and 80 MHz channels, respectively.

At block 1020, the UE 115 may receive a configuration of which of the bandwidth parts will be used for uplink transmission. The operations of block 1020 may be performed according to the methods described herein. In some examples, the UE 115 may receive a configuration with one or more BW parts configured for uplink transmissions as described herein.

At block 1030, the UE 115 may receive a configuration of a priority among bandwidth parts configured for uplink transmission. The operations of block 1020 may be performed according to the methods described herein. In some examples, the UE 115 may receive a priority among the BW parts configured for uplink transmissions. The UE 115 may perform an LBT procedure on the uplink BW parts in an order defined by such priority to contend for the access an At block 1040, the UE 115 may receive a configuration of multiple bandwidth parts configured for downlink transmission. The operations of block 1040 may be performed according to the methods described herein. In some examples, the UE 115 may report measurements related to interferers near the UE. Accordingly, the UE 115 may be configured with the downlink BW parts based on measurement reporting to minimize interference to the nearby nodes with active transmissions.

At block 1050, the UE 115 may receive a configuration of a priority associated with a common search space among the multiple bandwidth parts configured for downlink transmission as described in block 1040. The operations of block 1050 may be performed according to the methods described herein.

At block 1060, the UE 115 may receive a configuration of a UE-specific control resource set for receiving cross-bandwidth part scheduling for an uplink grant. The operations of block 1060 may be performed according to the methods described herein.

Figure 11:
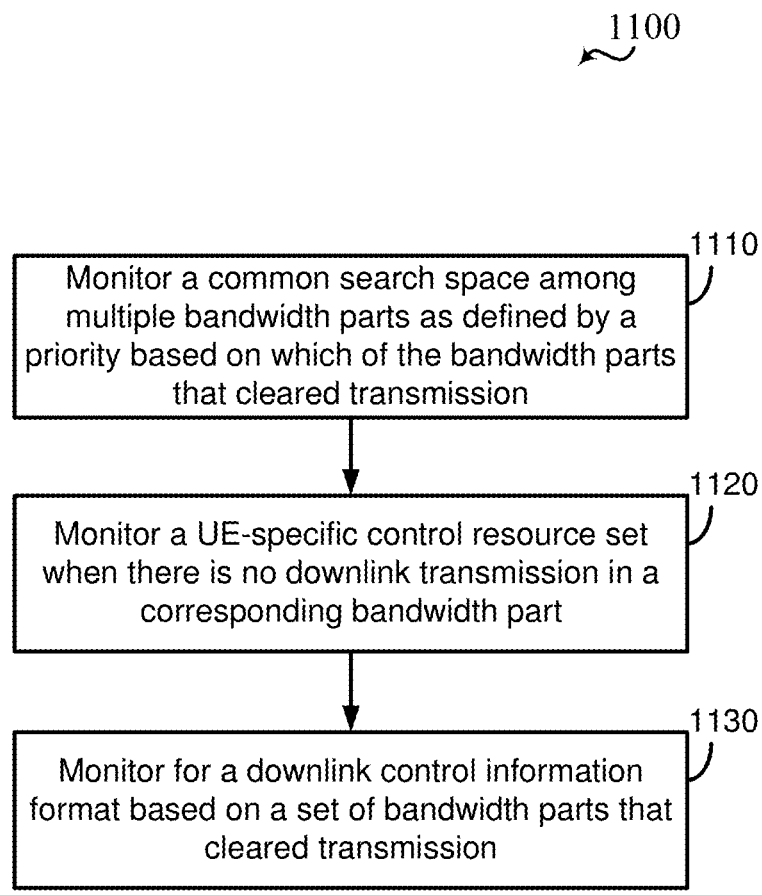

In FIG. 11, a method 1100 for supporting a configuration of bandwidth parts in a shared spectrum is provided. In some examples, the UE 115 may perform any combination of the blocks of method 1100 as described below and with reference to FIG. 2.

At block 1110, the UE 115 may monitor a common search space among multiple bandwidth parts as defined by a priority based on which of the bandwidth parts that cleared transmission. The operations of block 1110 may be performed according to the methods described herein. In some examples, the UE 115 may monitor the common search space in the BW parts as defined by a priority depending on which BW parts clear the medium in a transmission opportunity. For example, the UE 115 may first monitor the common search space of the highest priority BW part, and if it did not clear the medium, UE may then go to the next priority BW part to monitor the common search space of the next priority BW part, and so forth.

At block 1120, the UE 115 may monitor a UE-specific control resource set (coreset) when there is no downlink transmission in a corresponding bandwidth part. The operations of block 1120 may be performed according to the methods described herein. In some examples, the base station 105 may configure the UE with multiple BW parts for downlink, and may configure a UE-specific coreset to receive cross-BW part scheduling. The UE 115 may detect that there is no downlink transmission on a corresponding BW part, and thus the UE monitors the UE-specific coreset on another BW part for an uplink grant (if any) associated cross-BW part scheduling.

At block 1130, the UE 115 may monitor for a downlink control information (DCI) format based on a set of bandwidth parts that cleared transmission. The operations of block 1130 may be performed according to the methods described herein. In some examples, the UE 115 may monitor for DCI of a particular size or payload depending on which set of BW parts have cleared the medium. In some other examples, the UE 115 may monitor for DCI of a particular type or format depending on which set of BW parts have cleared the medium as described herein.

Figure 12:
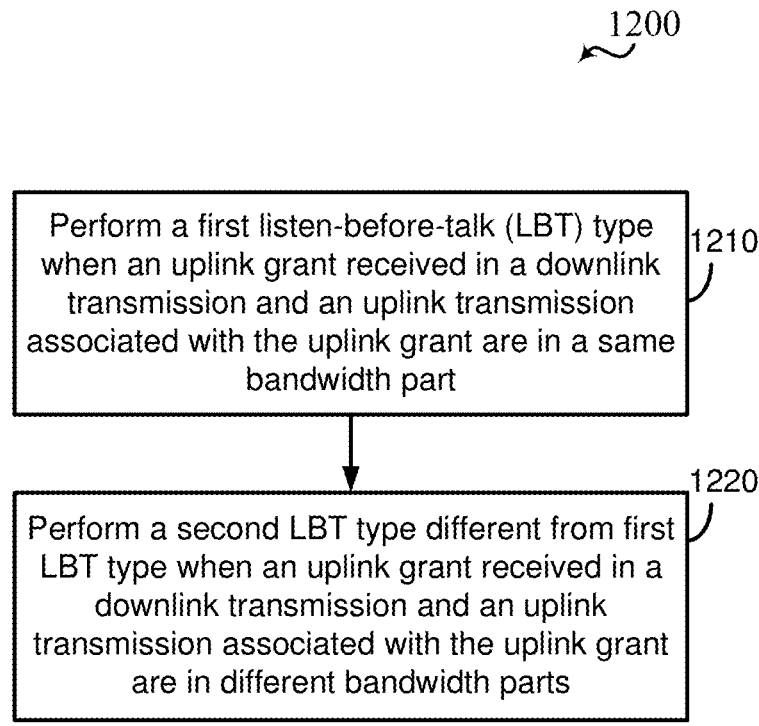

In FIG. 12, a method 1200 for supporting a configuration of bandwidth parts in a shared spectrum is provided. In some examples, the UE 115 may perform different LBT procedures based on the type of scheduling that is used.

At block 1210, the UE 115 may perform a first listen before talk (LBT) type when an uplink grant received in a downlink transmission and an uplink transmission associated with the uplink grant are in a same bandwidth part. The operations of block 1210 may be performed according to the methods described herein. In some examples, the UE may perform a short or one-shot LBT prior to transmitting on the uplink if the uplink grant and scheduled uplink transmission are in the same BW part.

At block 1220, the UE 115 may perform a second LBT type different from the first LBT type when an uplink grant received in a downlink transmission and an uplink transmission associated with the uplink grant are in different bandwidth parts. The operations of block 1220 may be performed according to the methods described herein. In some examples, the UE 115 may perform a long or extended LBT prior to transmitting on the uplink if the uplink grant and scheduled uplink transmission are in different BW parts.

Figure 13:
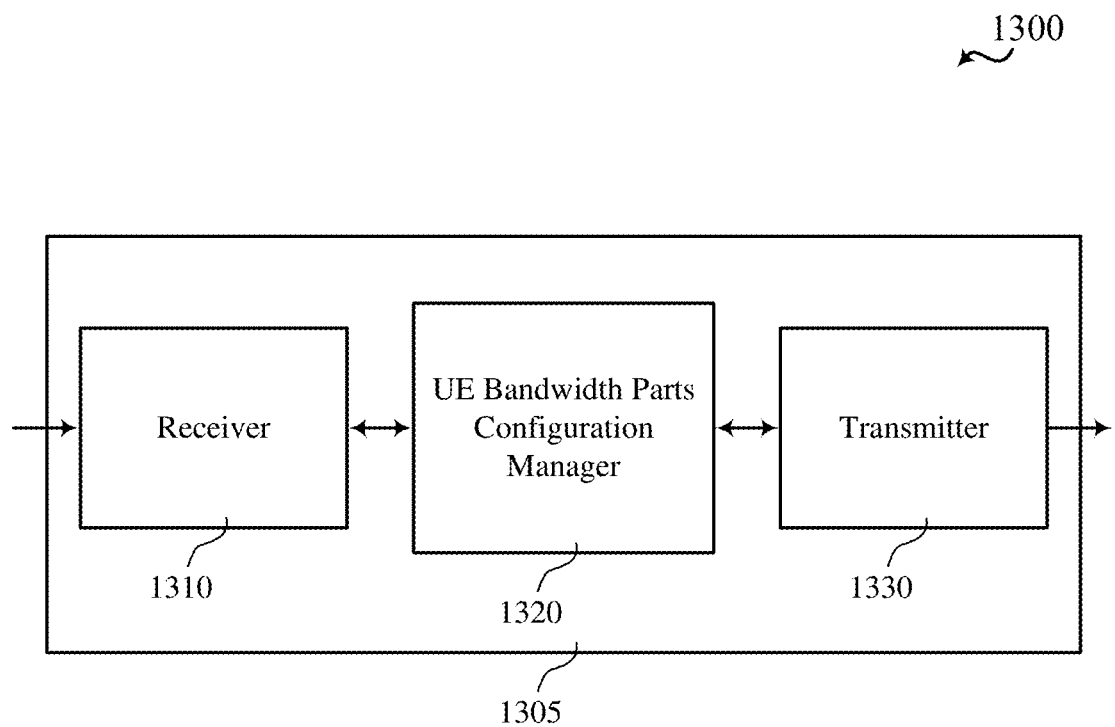
FIG. 13 illustrates a block diagram of a device that supports a configuration of bandwidth parts in a shared spectrum in accordance with aspects of the present disclosure.

FIG. 13 shows a block diagram 1300 of a wireless device 1305 that supports long term channel sensing in a shared spectrum in accordance with aspects of the present disclosure. Wireless device 1305 may be an example of aspects of a UE 115 as described herein. Wireless device 1305 may include receiver 1310, UE long term channel sensing manager 1320, and transmitter 1330. Wireless device 1305 may also include a processor. Each of these components may be in communication with one another (e.g., via one or more buses).

Receiver 1310 may receive information such as packets, user data, or control information associated downlink signals/channels such as PSS/SSS, PBCH, PHICH, PDCCH, PDSCH, and the like. Information may be passed on to other components of the device. The receiver 1310 may be an example of aspects of the transceiver 1435 described with reference to FIG. 14. The receiver 1310 may utilize a single antenna or a set of antennas.

UE bandwidth parts configuration manager 1320 may be an example of aspects of the UE bandwidth parts configuration manager 1415 described with reference to FIG. 14.

UE bandwidth parts configuration manager 1320 and/or at least some of its various sub-components may be implemented in hardware, software executed by a processor, firmware, or any combination thereof. If implemented in software executed by a processor, the functions of the UE bandwidth parts configuration manager 1320 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE bandwidth parts configuration manager 1320 and/or at least some of its various sub-components may be physically located at various positions, including being distributed such that portions of functions are implemented at different physical locations by one or more physical devices. In some examples, UE bandwidth parts configuration manager 1320 and/or at least some of its various sub-components may be a separate and distinct component in accordance with various aspects of the present disclosure. In other examples, UE bandwidth parts configuration manager 1320 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE bandwidth parts configuration manager 1320 may receive and maintain configuration parameters to support operation in bandwidth parts in a shared spectrum. In some examples, UE bandwidth parts configuration manager 1320 may control procedures and methods described with reference to FIGS. 2 and 10-12.

Transmitter 1330 may transmit signals generated by other components of the device. In some examples, the transmitter 1330 may be collocated with a receiver 1310 in a transceiver module. For example, the transmitter 1330 may be an example of aspects of the transceiver 1435 described with reference to FIG. 14. The transmitter 1330 may utilize a single antenna or a set of antennas.

Figure 14:
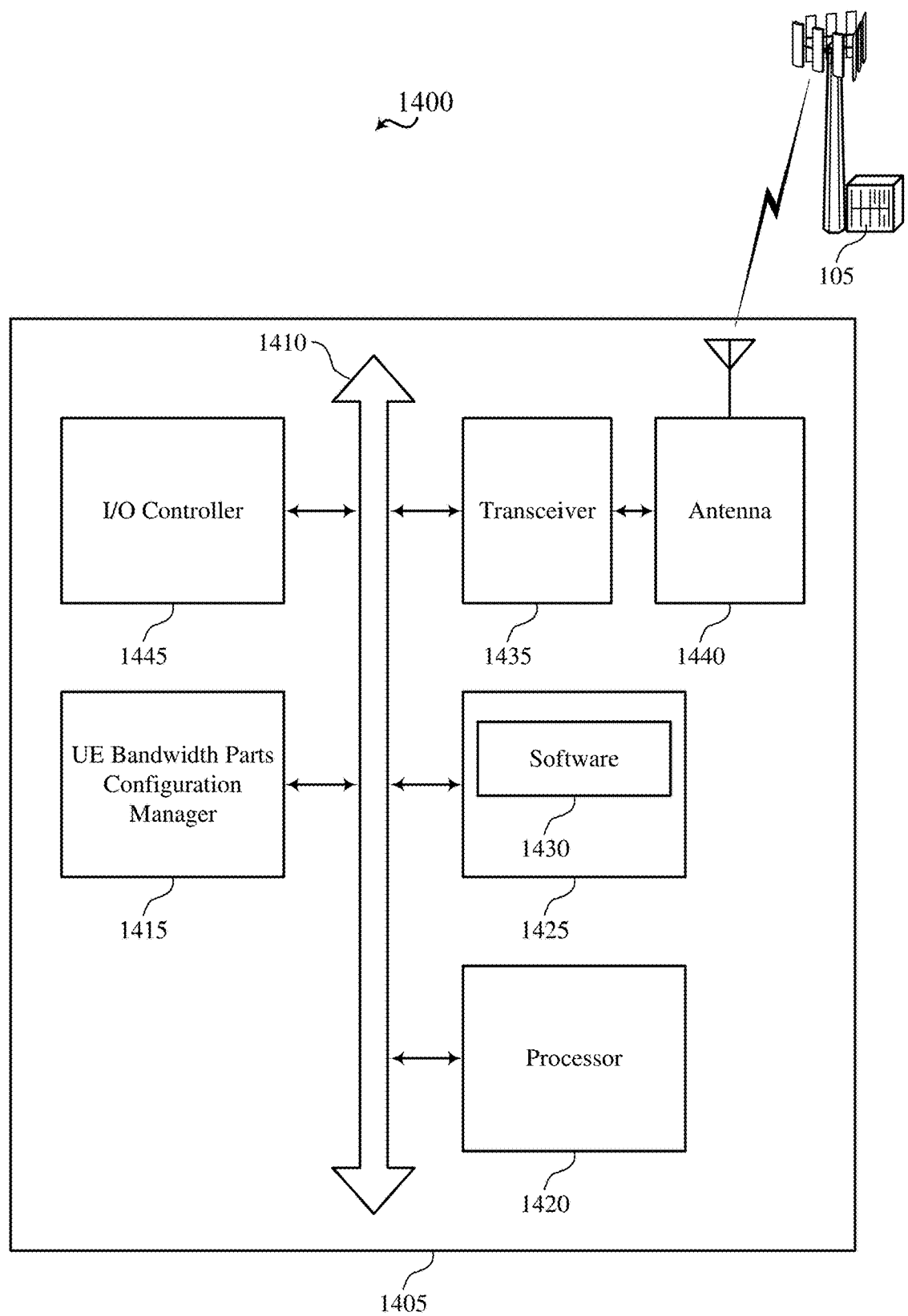
FIG. 14 illustrates a block diagram of a system including a UE that supports a configuration of bandwidth parts in a shared spectrum in accordance with aspects of the present disclosure.

FIG. 14 shows a diagram of a system 1400 including a device 1405 that supports long term channel sensing in a shared spectrum in accordance with aspects of the present disclosure. Device 1405 may be an example of or include the components of UE 115 as described above herein. Device 1405 may include components for bi-directional voice and data communications including components for transmitting and receiving communications, including UE bandwidth parts configuration manager 1415, processor 1420, memory 1425, software 1430, transceiver 1435, antenna 1440, and I/O controller 1445. These components may be in electronic communication via one or more buses (e.g., bus 1410). Device 1405 may communicate wirelessly with one or more base stations 105.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting operation with multiple BW parts in a shared spectrum).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support multiple BW parts a shared spectrum. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

I/O controller 1445 may manage input and output signals for device 1405. I/O controller 1445 may also manage peripherals not integrated into device 1405. In some cases, I/O controller 1445 may represent a physical connection or port to an external peripheral. In some cases, I/O controller 1445 may utilize an operating system such as iOS®, ANDROID®, MS-DOS®, MS-WINDOWS®, OS/2®, UNIX®, LINUX®, or another known operating system. In other cases, I/O controller 1445 may represent or interact with a modem, a keyboard, a mouse, a touchscreen, or a similar device. In some cases, I/O controller 1445 may be implemented as part of a processor. In some cases, a user may interact with device 1405 via I/O controller 1445 or via hardware components controlled by I/O controller 1445.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. It should be noted that the base stations may be deployed by the same operator or different operators. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and TDD system 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   configuring, by a base station associated with a first radio access technology (RAT), a system bandwidth of shared spectrum partitioned into a plurality of bandwidth parts based on interference associated with each of the plurality of bandwidth parts, wherein a second RAT different from the first RAT is associated with the interference; and
   transmitting, by the base station, a configuration of the system bandwidth to a plurality of devices associated with the first RAT.

2. The method of claim 1, further comprising configuring each bandwidth part to match a system requirement of the second RAT associated with the interference.

3. The method of claim 2, wherein the system requirement comprises at least one of a power spectral density, channelization, maximum transmit power, bandwidth requirement, or combination thereof.

4. The method of claim 1, further comprising performing channel sensing on each bandwidth part independent of the other bandwidth parts.

5. The method of claim 1, further comprising performing spatial listen-before-talk (LBT) on each bandwidth part independent of the other bandwidth parts.

6. The method of claim 1, further comprising adjusting a transmission power on each bandwidth part independent of the other bandwidth parts.

7. The method of claim 1, further comprising:
   configuring a first bandwidth part of the plurality of bandwidth parts for downlink transmission based on a measurement report from a user equipment (UE) intended to receive the downlink transmission; and
   configuring a second bandwidth part of the plurality of bandwidth parts for uplink transmission based on interference measured at the base station.

8. The method of claim 1, further comprising configuring, for a user equipment (UE), multiple bandwidth parts for downlink transmission, wherein the configuration of the multiple bandwidth parts comprises a priority for a common search space among the multiple bandwidth parts.

9. The method of claim 8, wherein the common search space is used for at least one of beam management information, paging information, transmit power control, system information broadcast, downlink control channel order grant, or combination thereof.

10. The method of claim 1, further comprising configuring, for a UE, a UE-specific control resource set (coreset) for receiving cross-bandwidth part scheduling for uplink, downlink, or sidelink.

11. The method of claim 10, further comprising configuring the UE to perform a first LBT type when an uplink grant is associated with self-bandwidth part scheduling, and to perform a second LBT type when an uplink grant is associated with the cross-bandwidth part scheduling;
wherein the first LBT type has a shorter duration than the second LBT type.

12. The method of claim 10, further comprising performing the cross-bandwidth part scheduling for an uplink grant only when the base station does not perform downlink transmission on a corresponding bandwidth part associated with the uplink grant.

13. The method of claim 1, further comprising configuring a priority among multiple bandwidth parts configured for uplink transmission.

14. The method of claim 13, wherein the uplink transmission comprises at least one of acknowledgement/non-acknowledgement (ACK/NACK) feedback, channel quality information (CQI) reporting, beam management reporting, or combination thereof.

15. A method for wireless communication, comprising:
receiving, from a base station associated with a first radio access technology (RAT), a configuration of a system bandwidth of shared spectrum, the system bandwidth being partitioned into a plurality of bandwidth parts based on interference associated with each of the plurality of bandwidth parts, wherein a second RAT different from the first RAT is associated with the interference; and
communicating, with the base station, on at least one of the bandwidth parts.

16. The method of claim 15, further comprising performing channel sensing on each bandwidth part independent of the other bandwidth parts; and
wherein the communicating comprises transmitting on the at least one of the bandwidth parts based on the channel sensing.

17. The method of claim 15, wherein the receiving the configuration of the system bandwidth comprises receiving a size of the at least one of the bandwidth parts.

18. The method of claim 15, further comprising receiving a configuration of which of the bandwidth parts will be used for uplink transmission.

19. The method of claim 18, further comprising:
reporting interference obtained at a user equipment (UE) intended to received downlink transmission; and
receiving a configuration of which of the bandwidth parts will be used for downlink transmission based on the reporting.

20. The method of claim 18, further comprising:
receiving a configuration of a priority among multiple bandwidth parts configured for the uplink transmission; and
transmitting at least one of ACK/NACK feedback, CQI reporting, beam management reporting, or combination thereof, on an available bandwidth part of the multiple bandwidth parts based on the priority.

21. The method of claim 15, further comprising:
receiving a configuration of multiple bandwidth parts configured for downlink transmission; and
monitoring a common search space among the multiple bandwidth parts as defined by a priority based on which of the multiple bandwidth parts that cleared transmission.

22. The method of claim 15, further comprising:
performing a first LBT type when an uplink grant received in a downlink transmission and an uplink transmission associated with the uplink grant are in a same bandwidth part; and
performing a second LBT type different from the first LBT type when an uplink grant received in a downlink transmission and an uplink transmission associated with the uplink grant are in different bandwidth parts.

23. The method of claim 22, wherein the first LBT type has a shorter duration than the second LBT type.

24. An apparatus for wireless communication, comprising:
a processor;
memory in electronic communication with the processor; and
instructions stored in the memory, wherein the instructions are executable by the processor to:
configure, by a base station associated with a first radio access technology (RAT), a system bandwidth of shared spectrum partitioned into a plurality of bandwidth parts based on interference associated with each of the plurality of bandwidth parts, wherein a second RAT different from the first RAT is associated with the interference; and
transmit, by the base station, a configuration of the system bandwidth to a plurality of devices associated with the first RAT.

25. The apparatus of claim 24, wherein the instructions are further executable by the processor to configure each bandwidth part to match a system requirement of the second RAT associated with the interference.

26. The apparatus of claim 24, wherein the instructions are further executable by the processor to perform channel sensing on each bandwidth part independent of the other bandwidth parts.

27. An apparatus for wireless communication, comprising:
a processor;
memory in electronic communication with the processor; and
instructions stored in the memory, wherein the instructions are executable by the processor to:
receive, from a base station associated with a first radio access technology (RAT), a configuration of a system bandwidth of shared spectrum, the system bandwidth being partitioned into a plurality of bandwidth parts based on interference associated with each of the plurality of bandwidth parts, wherein a second RAT different from the first RAT is associated with the interference; and
communicate, with the base station, on at least one of the bandwidth parts.

28. The apparatus of claim 27, wherein the instructions are further executable by the processor to:
perform channel sensing on each bandwidth part independent of the other bandwidth parts; and
transmit on the at least one of the bandwidth parts based on the channel sensing.

29. The apparatus of claim 27, wherein the instructions are further executable by the processor to receive a configuration of which of the bandwidth parts will be used for uplink transmission.

30. The apparatus of claim 27, wherein the instructions are further executable by the processor to:
- perform a first LBT type when an uplink grant received in a downlink transmission and an uplink transmission associated with the uplink grant are in a same bandwidth part; and
- perform a second LBT type different from the first LBT type when an uplink grant received in a downlink transmission and an uplink transmission associated with the uplink grant are in different bandwidth parts.

\* \* \* \* \*